Feb. 11, 1964 W. F. JESSUP 3,120,723
MACHINE TOOL MECHANISM FOR THE FORMATION OF CIRCULAR CONTOURS
Filed Oct. 24, 1961 8 Sheets-Sheet 2

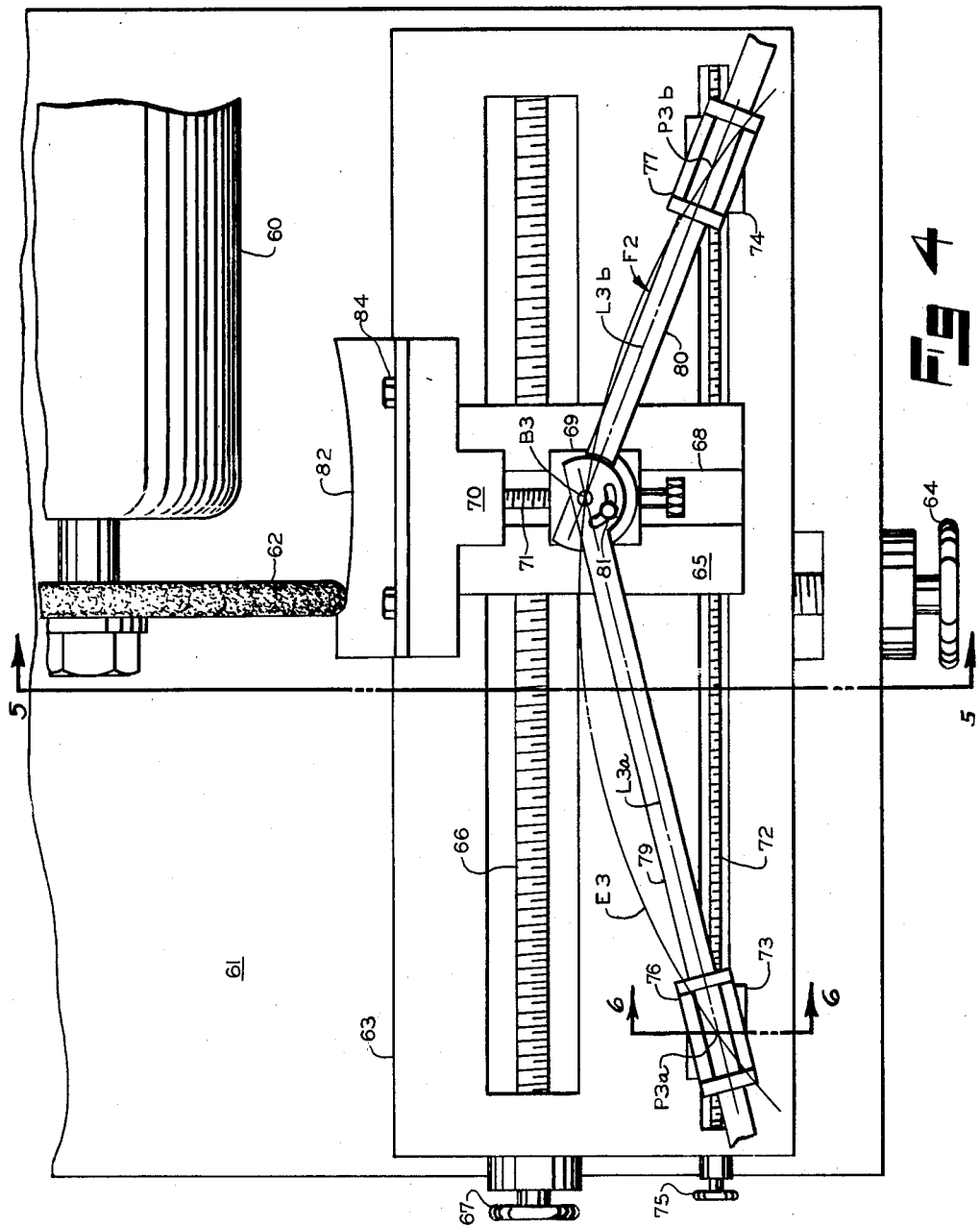

Feb. 11, 1964 W. F. JESSUP 3,120,723
MACHINE TOOL MECHANISM FOR THE FORMATION OF CIRCULAR CONTOURS
Filed Oct. 24, 1961 8 Sheets-Sheet 4
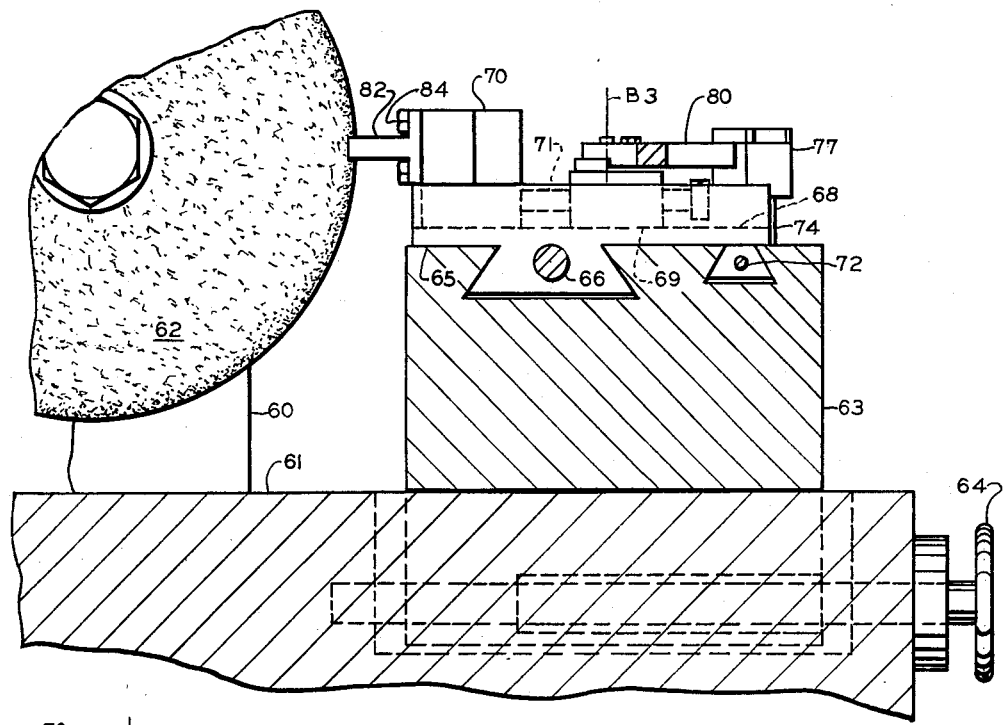
Fig 9
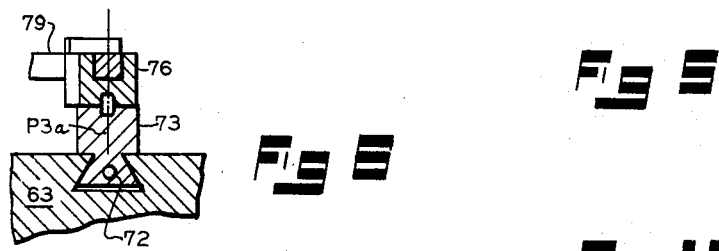
Fig 8
Fig 10
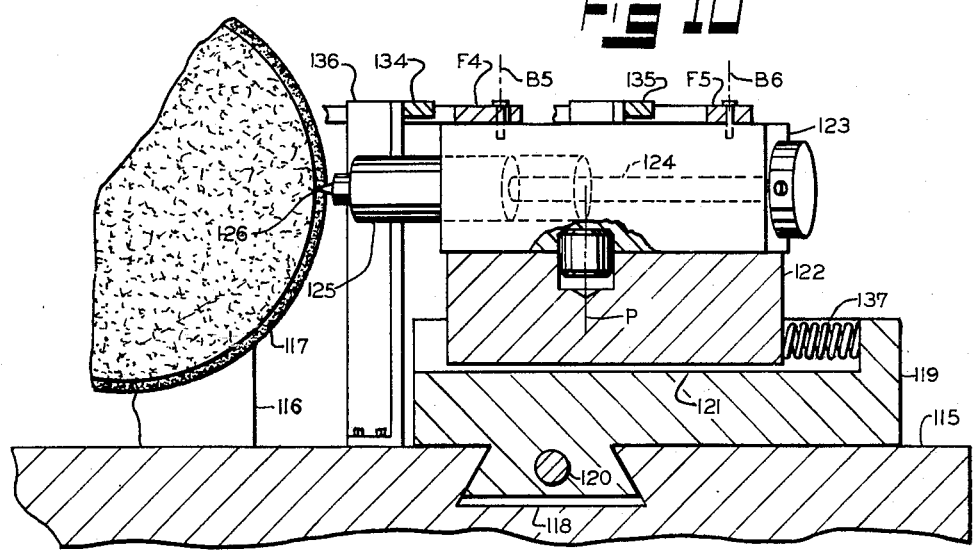

Feb. 11, 1964  W. F. JESSUP  3,120,723
MACHINE TOOL MECHANISM FOR THE FORMATION OF CIRCULAR CONTOURS
Filed Oct. 24, 1961  8 Sheets-Sheet 5

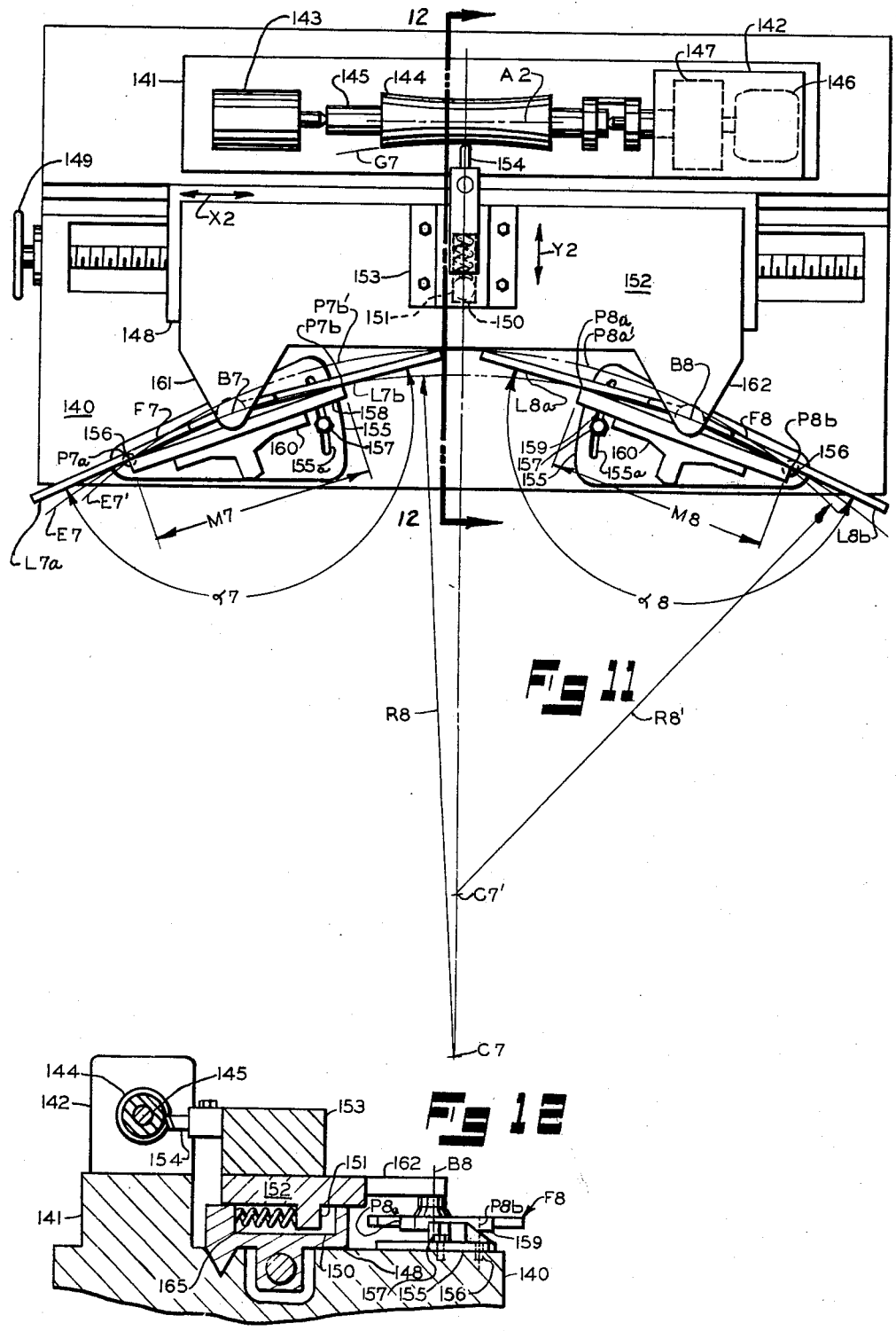

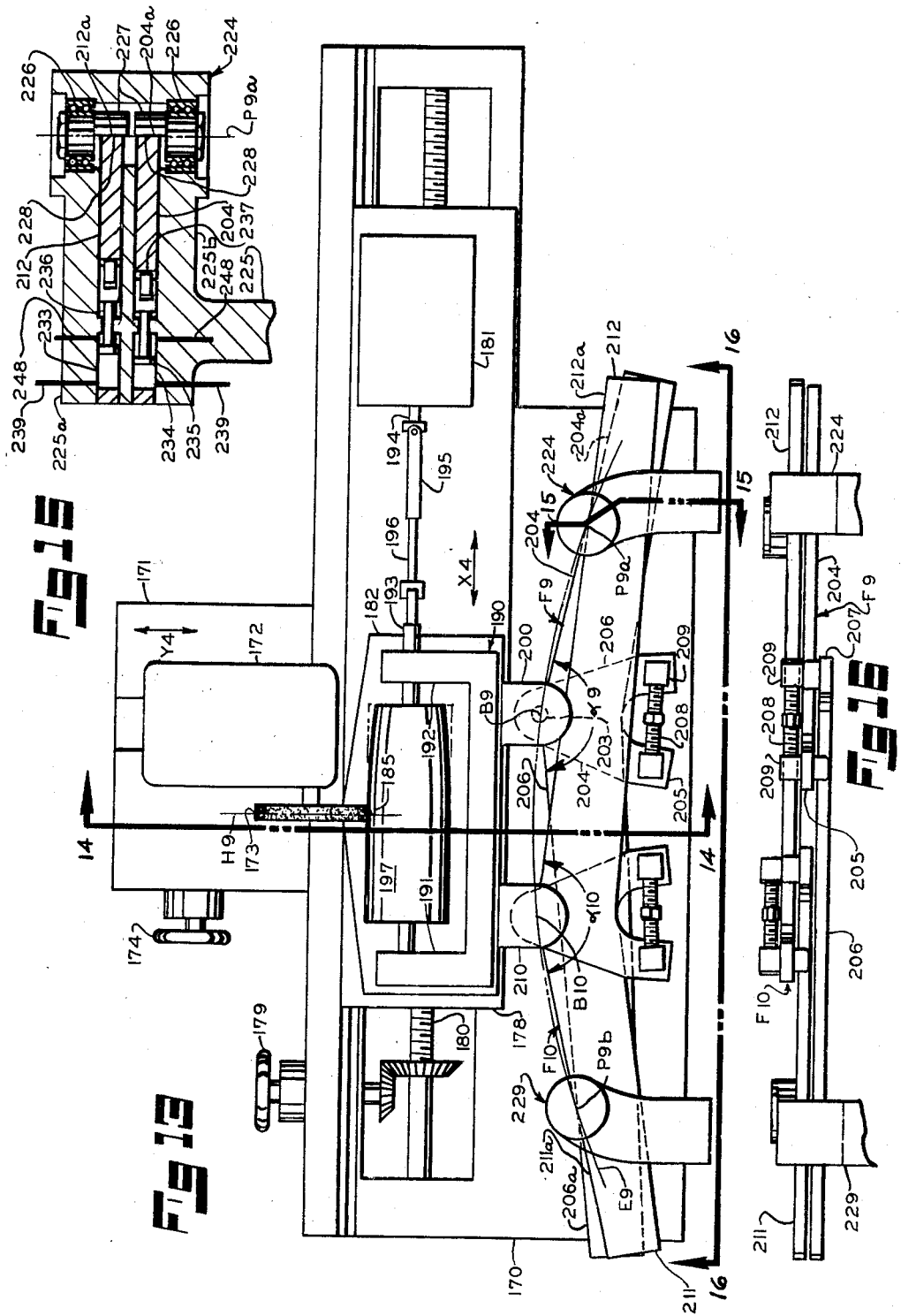

United States Patent Office 3,120,723
Patented Feb. 11, 1964

3,120,723
MACHINE TOOL MECHANISM FOR THE FORMA-
TION OF CIRCULAR CONTOURS
Wilbur F. Jessup, Lyon, France, assignor to The Cincinnati Milling Machine Company, Cincinnati, Ohio, a corporation of Ohio
Filed Oct. 24, 1961, Ser. No. 147,269
12 Claims. (Cl. 51—60)

The present invention relates to a machine tool and, more particularly, to mechanism for producing a circular contour on an object to be formed such as, for example, producing a crown on a roll or truing a circular contour on a grinding wheel, which mechanism is particularly suitable for forming a circular contour of large radius.

Rolling mill rolls for producing sheet steel or other sheet material generally have a slight crown, or camber, to compensate for deflection or distortion of the roll during operation, and this crown may have a large radius of curvature of, for example, several hundred inches. Also in many grinding operations it is necessary that the grinding wheel have an arcuate concave or convex contour of large radius on its periphery for imparting a desired shape to a workpiece. In forming these objects, and in many other machining operations, it is often desirable that the contour produced define a circular arc, and it is therefore one object of the present invention to provide improved mechanism for producing a circular contour of large radius on an object to be formed.

To form a circular contour on an object to be formed it is necessary to effect a relative movement between the object to be formed and the forming tool in which one moves in a circular arc about a center fixed relative to the other. This relative circular movement may be produced by holding either the member carrying the forming tool or the member carrying the object to be formed fixed, and pivoting the other member about a fixed center in said other member or connected to said other member by a radius arm. This method, while most satisfactory for circular arcs of relatively small radius, becomes impractical for large radii because a radius member must be utilized which is at least as long as the radius of the desired circular arc. It is therefore another object of the present invention to provide mechanism for effecting a relative movement between one machine tool member, such as the member carrying the object to be formed, and another machine tool member, such as the member carrying the forming tool, in which one member moves in a circular arc about a center fixed relative to the other member which does not require a radius member to define the circular path of movement of said one member, and in which the center may be spaced from said other member.

Another possible method of effecting the desired circular movement between two machine tool members is to utilize a circular cam to control the motion of one of said members so that the relative motion between the members defines the desired circular arc. While a cam can be formed to produce a contour of large radius, a cam is difficult and expensive to produce, and each cam can be utilized to produce only a circular contour of a single predetermined radius. Relative motion between two machine tool members to produce a circular contour on a workpiece can also be effected by means of a pattern controlled tracer mechanism but a pattern, like a cam, is difficult to form and each pattern can be utilized for contours of only a single predetermined radius. It is therefore yet another object of the present invention to provide mechanism for the generation, without a circular cam or pattern, of relative circular movement between two machine tool members to generate circular contours of selected radii.

Mechanisms have heretofore been utilized which provide relative movement between two machine tool members defining an arc of a selected radius of curvature without the use of radius arms, cams, or patterns, and these mechanisms have been utilized in the formation of contours of large radii of curvature in objects to be formed. For example, in U.S. Patent 2,930,373, issued March 29, 1960, to Wilbur F. Jessup and Robert H. Weisgerber, there is shown a mechanism for forming an arcuate contour on a grinding wheel utilizing a straight follower bar pivotally connected to the member supporting the truing tool, and a pair of straight, angularly oriented, guides fixed relative to the grinding wheel. With this mechanism the tool, when moved across the grinding wheel, produces a contour thereon defined mathematically by the expression $$\frac{x^2}{L^2\dfrac{\tan^2 \alpha/2}{4}} + \frac{y^2}{\dfrac{L^2}{4 \tan^2 \alpha/2}} = 1$$

where $x$ and $y$ are distances from the intersection of the guides, $L$ is the length of the follower bar, and $\alpha$ is the angle between the guides. The radius of curvature $\rho$ is equal to $$\frac{L}{2} \tan^3 \frac{\alpha}{2}$$

At a particular setting of the guides, specifically when $\alpha=90°$, a circular contour of radius $L/2$ is produced on the grinding wheel. The range of circular contours which can be produced with this mechanism is thereby limited by the practical limitations on the length of the follower bar, which must be twice the length of the desired radius. While large radii of curvature can be obtained, by adjusting the guides so $\alpha$ approaches 180°, the contours formed will be elliptical in conformation. It is therefore still another object of the present invention to provide a mechanism which produces relative circular movement between two machine tool members with any setting of the mechanism so that selected contours of circular conformation, up to contours of infinite radius, can be produced on objects to be formed.

In some prior art mechanisms for forming arcuate contours on work, such as in the mechanism of U.S. Patent 2,930,373, the tool moves in translation relative to the work which is being formed, and hence the angle at which the tool is oriented relative to the arcuate surface being contoured changes as the tool is moved across the work, and in some embodiments of the present invention relative translational movements between the forming tool and the object to be formed is utilized in the formation of circular contours. While a changing tool angle may not be a significant disadvantage in some applications, particularly where an arcuate contour of a very large radius is being formed by a pointed tool such as a truing diamond, it is desirable in some machining operations to keep the tool at a constant angle with the arcuate contour being formed. It is therefore another object of the present invention to provide, in some embodiments of the invention, mechanism for producing circular contours on an object to be formed in which the forming tool is held at a desired unchanging angle to the contour of the surface being formed as the tool moves across the work, or as the work moves across the tool.

In the present invention, the member which carries the forming tool and the member which carries the object to be formed are relatively movable so that a relative transverse and a relative to and fro movement can be effected between the forming tool and the object to be formed. The vertex of a V-shaped follower is pivotally connected to one of these members and the two arms of the follower are held in engagement, respectively, with two transversely spaced guides located on opposite sides of said one member, which guides are fixed relative to the other member, the guides defining two transversely spaced guide points in the plane of the follower. As a relative transverse movement is effected between the two machine tool members (to effect relative transverse movement between the forming tool and the object to be formed), a relative transverse movement results between the arms of the follower (pivotally connected to one of said members) and the respective guide points (fixed relative to the other member) which effects a relative to and fro contouring movement between the members coordinated with the relative transverse movement therebetween. With this construction, the pivot axis of the follower bar will lie, in any transverse position of the pivot axis between the guide points, on a circular arc passing through the guide points, the circular arc having a center fixed relative to the guide points. Therefore when relative transverse movement is effected between the follower and the guides, the pivot axis must move in a circular arc relative to the guide points, and hence relative to the other member which is fixed relative to the guide points. Thus the member to which the follower is pivotally connected will be moved, at the pivot connection, relative to the other member, along a circular path having a center fixed relative to said other member.

If relative movement between the two members is in translation (that is, without relative rotation therebetween) all points on the member to which the follower is connected will move relative to the other member in the same manner as the pivot connection, and a single follower will coordinate the contouring to and fro movement between the forming tool and the object to be formed with the relative transversing movement therebetween. With only relative translational movement between the member carrying the forming tool and the member carrying the object to be formed, the angle of the tool to the contour being formed changes as the tool moves across the object to be formed.

When it is necessary to maintain the tool at a constant angle to the circular contour being formed, as, for example, normal to the surface, the two machine tool members are mounted for relative movement, not only for relative transverse and to and fro movement, but also for relative rotation, or swiveling. Two V-shaped follower bars, the vertexes of which are pivotally connected, at spaced apart axes, to one of the machine tool members, are held in engagement with spaced guide points fixed relative to the other member. Thus, two points (the pivot axes) of said one member move relative to the other member in circular arcs having centers fixed relative to the other member. These two circular arcs are concentric, and since two points on said one member move in circular arcs about a common center fixed relative to the other member, any point on said one member moves in a circular arc about that center relative to the other member. Thus if the tool is carried by said one member, and oriented, for example, along a radius emanating from that center, the tool will shape a circular contour on an object to be formed carried by the other member, and will remain normal to the surface being contoured.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 4 is plan view of the grinding wheel and workpiece support of a grinding machine;

FIG. 5 is a view taken on the line 5—5 of FIG. 4;

FIG. 6 is a view taken on the line 6—6 of FIG. 4;

FIG. 10 is a view taken on the line 10—10 of FIG. 9;

FIG. 11 is a plan view of a machine for forming a convex circular contour on a workpiece;

FIG. 12 is a view taken on the line 12—12 of FIG. 11;

FIG. 13 is a plan view of a roll grinder; and

Figure 14:
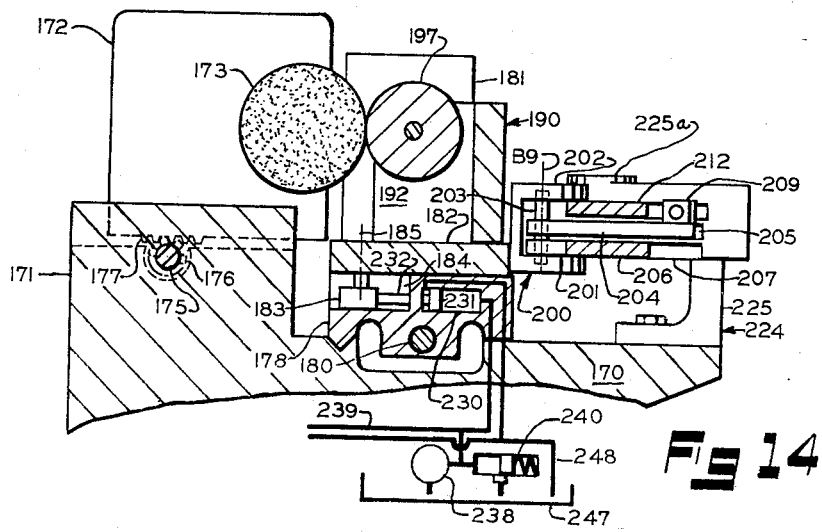

FIGS. 14, 15, and 16 are views taken on the lines 14—14, 15—15, and 16—16, respectively, of FIG. 13.

Figure 1:
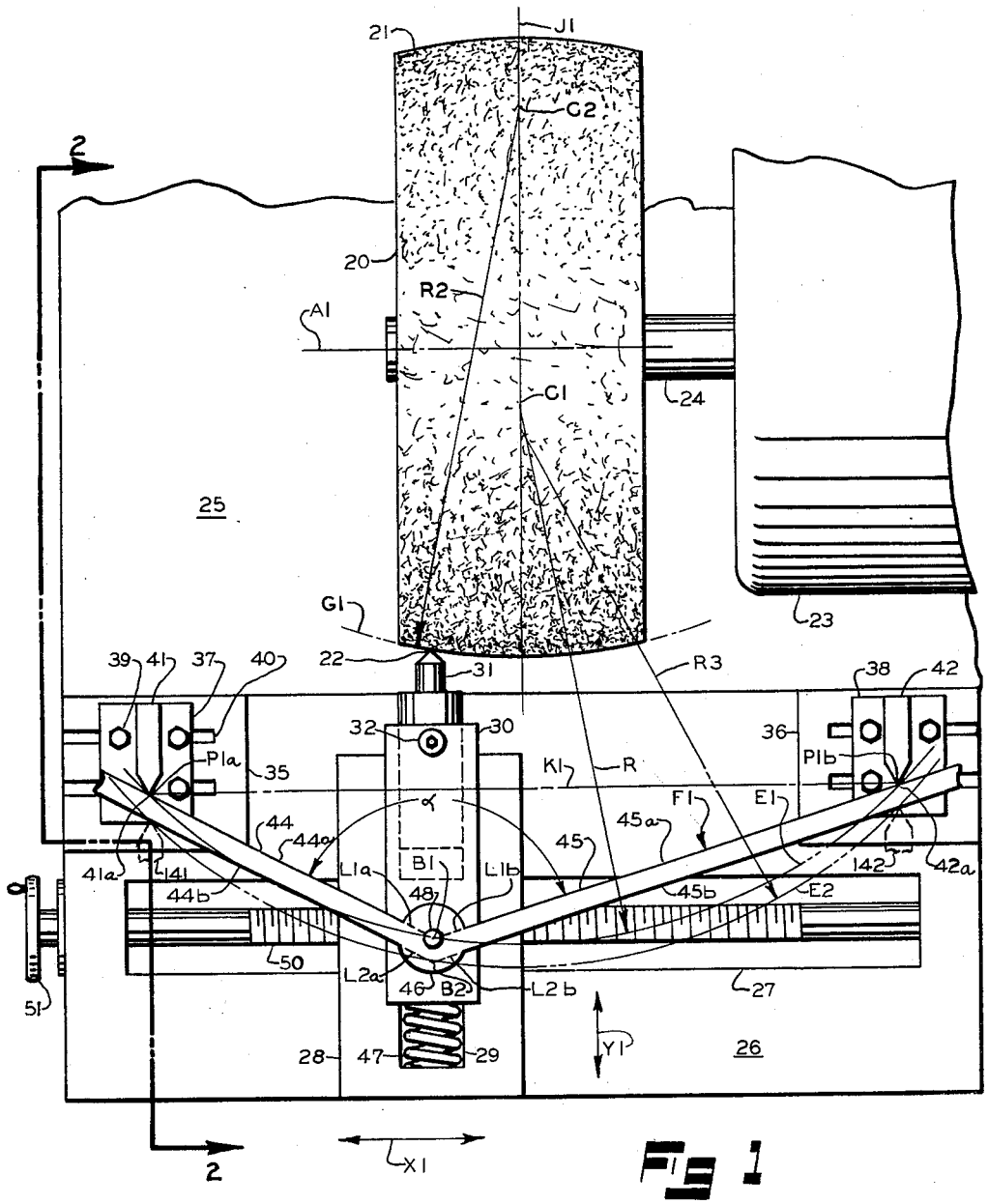
FIG. 1 is a plan view of the grinding wheel and truing mechanism of a grinding machine.
Figure 2:
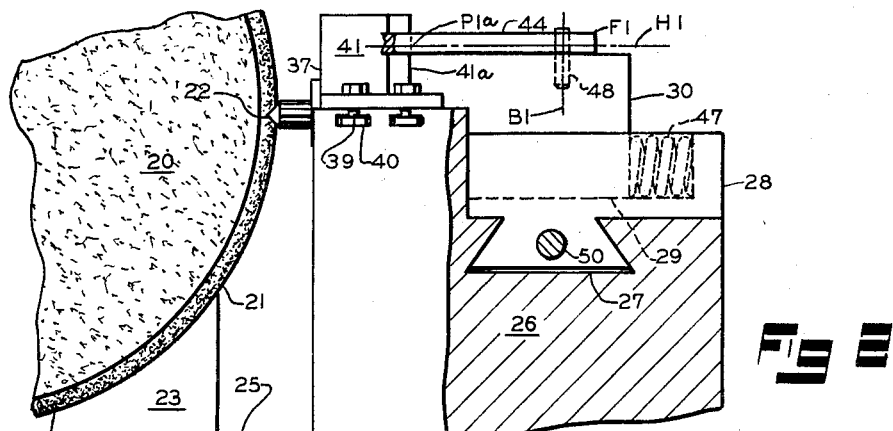
FIG. 2 is a view taken on line 2—2 of FIG. 1.

There is shown in FIGS. 1 and 2 the truing mechanism and grinding wheel of a grinding machine. In this embodiment of the invention, the grinding wheel 20 comprises the object to be formed, and a contour defining a convex circular arc is formed on the periphery 21 thereof by a diamond point 22 which comprises the forming tool. The grinding wheel 20 is carried by a wheelhead 23 containing a motor (not shown) for rotation of the grinding wheel about the axis A1 of wheelhead shaft 24. The wheelhead 23 is mounted on base 25, and fixed during truing relative thereto, so that during truing the grinding wheel is rotated in a fixed position on base 25. Base 25 has a ledge portion 26 which has an elongated recess 27, extending in the transverse direction X1 relative to the grinding wheel, the recess formed to slidably receive the depending dovetailed portion of slide 28. Slide 28 has an elongated recess 29, extending in a to and fro direction Y1 perpendicular to the transverse direction of recess 27. The recess 29 is formed to slidably receive the depending dovetailed portion of a tool-carrying member 30. The diamond point 22 is received in a diamond holder 31 which, in turn, is secured in member 30 by set screw 32.

The ledge portion 26 of base 25 has two transversely spaced pedestals 35 and 36, on which are secured, respectively, guides 37 and 38 by means of bolts 39 received in T-slots 40. The guides 37 and 38 have upstanding portions 41, 42, respectively, having straight line edges 41a, 42a which extend perpendicular to the plane X1, Y1 of relative motion between the forming tool and the object to be formed. A V-shaped follower, indicated generally at F1, lies in a plane H1 parallel to the X1, Y1 plane of relative motion between the forming tool and the object to be formed. The follower has a pair of arms 44, 45, held a predetermined angle α apart during truing, which extend from a hub 46 at the vertex of the follower. A spring 47, under compression, is received in recess 29 of slide 28, and is interposed between the end of the recess away from the grinding wheel and the depending dovetail portion of the tool carrying member 30. The follower bar, which is pivotally connected at pivot pin in vertex hub 46 to the tool carrying member 30 by pin 48, with the open end of the V facing the grinding wheel, is urged against the upstanding guide portions 41 and 42 by spring 47. The straight edges 44a and 45a of the arms 44, 45, engage, respectively, the pointed edges 41a, 42a of the guides (which are on opposite sides of the member 30) and the pivot axis B1 is located at the intersection of the straight lines L1a, L1b defined by the edges 44a, 45a.

Relative transverse movement between the member 23, which carries the grinding wheel, and the member 30, which carries the tool, and hence relative transverse movement between the forming tool and the object to be formed, is effected by transverse movement of member 30 through transverse movement of member 28. To effect this movement, screw 50, journaled in base portion 26 and threadedly engaged in the depending portion of slide 28, is rotated by handwheel 51. As member 30 is moved transversely, the follower bar, which is pivotally connected to member 30 at pivot axis B1, is moved transversely relative to the fixed guide edges 41a, 42a with the arms of the follower bar held in engagement with the guide edges 41a, 42a by spring 47. The edges 41a, 42a define points P1a, P1b (which may be considered guide points) in the plane H1 of the follower and the lines L1a, L1b (which may be considered guide lines) define the locus of points on the arms which intersect the guide points as the follower arms are moved transversely across the guides. At any given position of the tool carrying member 30 in the X1 direction, the three points P1a, P1b, and the point defined by the pivot axis B1 in the plane H1 of the follower, define a circle E1 in the plane H1. Since the guide points P1a, P1b are fixed, the circle is fixed and has a fixed center C1. As the member 30 moves transversely in the X1 direction, the member 30 is moved in the Y1 contouring direction, in coordination with the transverse movement thereof, by virtue of the coaction between the fixed guide points and the follower so that pivot axis B1 follows the circle E1 and the pivot axis moves in a circular path relative to the fixed grinding wheel 20 about the center C1 which is fixed relative to the grinding wheel.

Recess 27 and the dovetailed portion of member 28 received therein confine slide 28 to movement along a straight path in the X1 direction on the base portion 26 without rotation thereon. Recess 29 and the dovetailed portion of member 30 received therein confine member 30 to movement along a straight path in the Y1 direction on member 28 without rotation thereon. Thus, member 30 moves in translation and, since wheelhead 23 is fixed during truing, the relative movement between members 23 and 30 (and hence the relative movement between the forming tool 22 and the object to be formed 20) is in translation. With member 30 constrained to move only in translation, any point on member 30, or fixed relative thereto, must move parallel to any other point thereon. Thus, forming tool point 22 moves in a circular arc G1, the radius R2 of which is the same as the radius R of circular arc E1, and the center C2 of which is also fixed relative to the grinding wheel but displaced from the center C1 of circular arc E1. With the grinding wheel 20 fixed during truing, a circular convex arc lying in circular arc G1 is formed on the periphery 21 thereof. The center of circular arc E1 lies on the perpendicular bisector J1 of an imaginary line K1 extending between the guide points P1a, P1b. In the forming tool 22 is positioned on member 30 in the transverse direction in alignment with pivot axis B1 as shown, the center C2 of arc G1 will also lie on the bisector line J1.

The tool 22 may, however, be spaced in the transverse direction from the position shown so that the center of arc G1 will be transversely spaced from the center of arc E1. It should also be noted that a convex arc would be formed on the grinding wheel 20 if the upstanding portions of the guides were positioned as at 141 and 142 and held engaged with the edges 44b, 45b of the follower arms. The pivot axis, if located (as indicated at B2) at the intersection of the guide lines L2a, L2b defined by follower arm edges 44b, 45b, would move in a circular arc E2 of radius R3 as shown.

Figure 3:
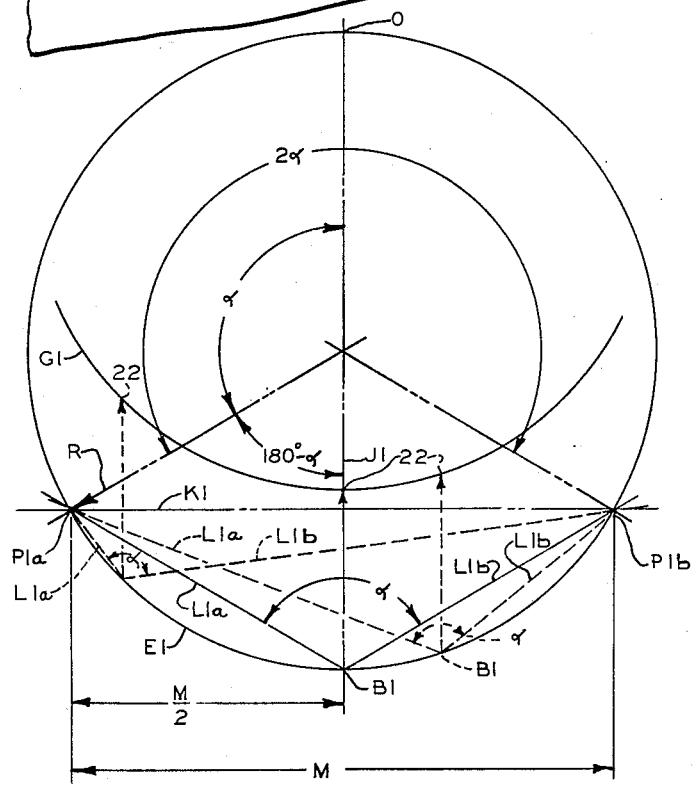
FIG. 3 is a geometrical diagram based on the mechanism of FIG. 1.

The fact that the pivot axis B1 at the vertex of the V-shaped follower moves in a circular path when the follower is engaged with and moved transversely relative to the guide points P1a, P1b is shown best in FIG. 3. Two intersecting lines which pass, respectively, through two fixed points, constitute chords of a circle defined by the two fixed points and the vertex at the point of intersection of the lines. Any inscribed angle (that is, an angle whose vertex is on a circle and whose sides are chords of the circle) is equal to one-half the intercepted arc and therefore all inscribed angles which intercept the same arc are equal. The necessary corollary to this geometric principle is that all equal angles intercepting the same arc of a circle must have their vertexes on the circle. Therefore chords, such as L1a, L1b, having a fixed angle ($\alpha$) therebetween, and intercepting an arc (P1a, O, P1b) of fixed magnitude intersect at a vertex (B1) lying on a circle (E1) passing through the points (P1a, P1b) defining the intercepted arc, and the vertex (B1) must lie on this circle (E1) in any position of the vertex between points (P1a, P1b) if the chords L1a, L1b pass through the points P1a, P1b and the angle $\alpha$ remains unchanged.

Referring to FIG. 3, $$\sin(\alpha) = \sin(180 - \alpha) = \frac{M/2}{R}$$

where M equals the transverse distance between the points P1a, P1b and R equals the radius of circle E1. Thus the radius R of the circular path of pivot axis B1 as relative transverse movement is effected between the follower and the guide points P1a, P1b equals $$\frac{M}{2 \sin \alpha}$$

If the angle $\alpha$ is set at a value approaching 180 degrees, the radius can be made very large without requiring a large value of M so that the follower bar need not be large to realize circular movement of large radius. For example, if $\alpha = 179°$ and $M = 34.90$ inches, the radius R will equal 1000 inches.

The embodiment of the invention shown in FIGS. 4, 5, and 6 differs from the embodiment shown in FIGS. 1 and 2 primarily in that: a grinding operation, instead of a truing operation, is shown; a concave arc, instead of a convex arc, is produced on an object to be formed; the object to be formed is moved during the forming operation instead of the tool; the guide points are defined, not by guide edges, but by the pivot axes of guide blocks; and the arms of the follower are held engaged with the guides, not by a spring, but by the guide blocks. In this embodiment, a wheelhead 60, mounted in a fixed position on a base 61 during grinding, rotatably carries grinding wheel 62 which, in this embodiment, constitutes the forming tool. A table 63, which can be moved on base 61 during set up towards or away from the grinding wheel by handwheel 64, is held in a fixed position on base 61 during grinding. The table has a slide 65 threadedly engaged with a screw 66 journaled in table 63 for transverse movement of slide 65 on table 63 by handwheel 67. Slide 65 has a recess 68, extending perpendicular to the transverse direction, which slidably receives two slides 69 and 70 held in adjusted spaced apart relation by a screw 71 journaled in slide 69 and threadedly received in slide 70.

A screw 72, journaled in table 63 and extending parallel to screw 66, has a left hand thread and a right hand thread engaged, respectively, with guide slides 73 and 74 so that, by rotation of handwheel 75 connected to screw 72, the guide slides (which remain fixed on table 63 a predetermined distance apart during grinding) can be positioned a predetermined distance apart during set up. The guide slide 73, 74 have guide blocks 76, 77, respectively, mounted thereon for pivoting about axes P3a and P3b respectively. A follower F2 has arms 79, 80, clamped a fixed angular distance apart by bolt 81, and the arms are slidably received, respectively, in guide blocks 76, 77. The arms have straight parallel sides engaged with the sides of the guide blocks and the locus of points on the arms passing through the guide points (defined by the pivot axes P3a, P3b) as the follower is moved transversely define straight guide lines L3a, L3b on the follower arms intersecting at B3. The follower is pivotally connected to slide 69 at axis B3 with the open end of the V facing away from the grinding wheel. A workpiece 82 is secured to slide 70 by bolts 84.

As the slide 65 is moved transversely by handwheel 67, slides 69 and 70 are moved in unison in translation towards and away from the grinding wheel by the cooperation of the follower pivotally connected to slide 69 and the guide points P3a, P3b which are fixed relative to the grinding wheel during grinding. The axis B3 will travel in circle E3 having a center on the perpendicular bisector of a line between the guide points and fixed relative to the grinding wheel. Thus the workpiece will be moved in a circular path and a concave circular contour will be formed on the workpiece.

Figure 7:
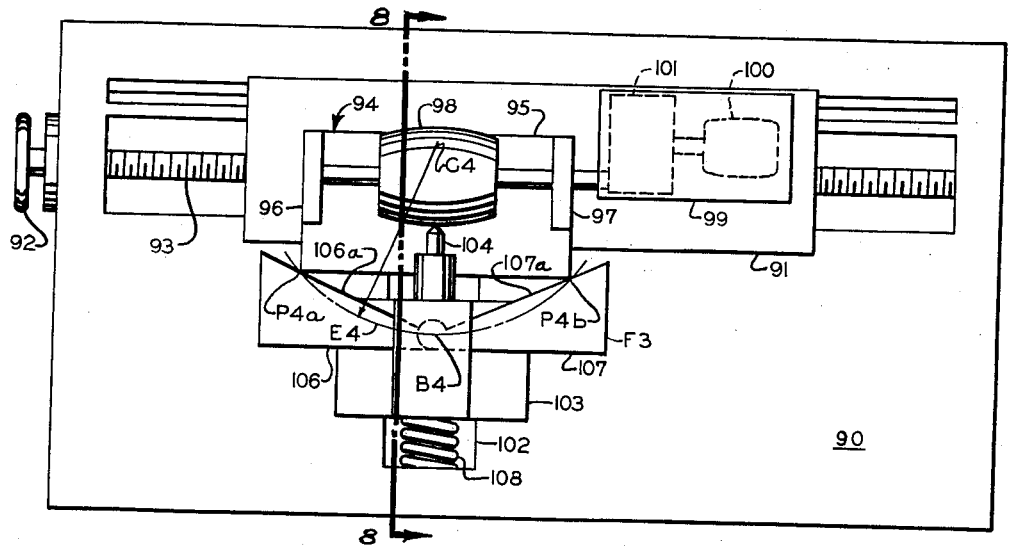
FIG. 7 is a plan view of a mechanism for forming a circular contour on a workpiece.
Figure 8:
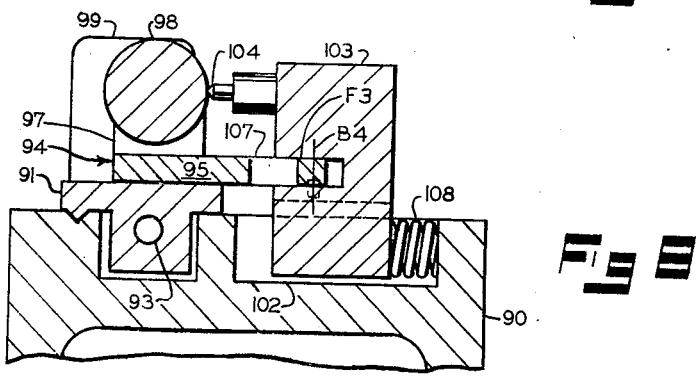
FIG. 8 is a view taken on the line 8—8 of FIG. 7.

In each of the two embodiments previously described, one of the two members which, respectively, carry the forming tool and the object to be formed, was held fixed during the operation while the other member was moved in a circular arc about a center which was also fixed. It is not, however, the absolute motion of one or the other of the members which is important but, instead, the relative motion between the members. In the embodiment of FIGS. 7 and 8, one of these members is moved in a circular arc about a center fixed relative to the other member (as in the previous embodiments) but neither member has absolute motion in a circular arc about a fixed center.

There is shown in FIGS. 7 and 8 a base 90 having a table 91 movable transversely thereon by means of handwheel 92 and screw 93. A bracket 94, having a base 95 and upstanding end plates 96, 97, is secured to table 91. A workpiece 98 which is to have a circular contour formed thereon is journaled in the end plates 96, 97 and is connected to a headstock 99 secured to table 91. The workpiece 98 is rotated by headstock motor 100 through headstock transmission 101. Base 90 has a recess 102 extending perpendicular to the direction of movement of table 91, and a slide 103, mounted on base 90 and having a forming tool 104 carried thereby, has a depending dovetail portion slidably received in recess 102. The two corner edges of base 95 facing slide 103 constitute guides which define transversely spaced guide points P4a, P4b, in the plane of a follower F3. Follower F3 has arms 106, 107 with the straight edges 106a, 107a, defining guide lines intersecting at point B4. The follower is connected to slide 103 for pivoting about axis B4 and the edges 106a, 107a of the follower arms are urged against the guides by virtue of compression spring 108 interposed between the depending dovetailed portion of slide 103 and the end of recess 102 away from table 91. As table 91 (and hence workpiece 98) is moved transversely by handwheel 92, the slide 103 (and hence forming tool 104) is moved perpendicular thereto by virtue of the transversely moving guide points (fixed relative to workpiece 98) acting on the follower (pivotally connected to slide 103). The circle E4 passing through the guide points, and the center C4 thereof, move transversely with and are fixed relative to, table 91, support bracket 94, and workpiece 98. The pivot axis B4, while not moving transversely, remains on circle E4 by virtue of the to and fro contouring movement imparted thereto by the transversely moving guides acting on the pivotal follower. Both support bracket 94 and slide 103 move in translation on the base and the forming tool 104 partakes of the same contouring movement, determined by and coordinated with the transverse movement of support bracket 94. Although neither pivot axis B4 nor workpiece 98 have absolute movement in a circular path (each moving only in straight lines), the relative motion of axis B4 (and tool 104) to bracket 94 (and workpiece 98) is on a circular path having a center fixed relative to bracket 94 and workpiece 98.

In the embodiments previously described, the tool carrying member and the member carrying the object to be formed have only relative movement in translation. In these embodiments, a single follower bar pivotally connected to one member, in conjunction with a pair of guide points fixed relative to the other member, coordinates all relative transverse and all relative to and fro movements between the members. Since, in these previous embodiments, the movement between these members, and hence the movement between the forming tool and the object to be formed, is translational without relative rotation therebetween, there is no relative rotation between the tool and the workpiece as, in formation of the circular contour thereon, the tool moves across the workpiece (or the workpiece moves across the tool). Thus the tool engages the workpiece at a changing angle as the circular contour is formed.

In applications where it is desirable that the forming tool maintain a constant angle (such as 90°) to the circular arc produced on the object to be formed, it is necessary that a relative swiveling, or turning, movement (in addition to a relative transverse movement and a relative to and fro movement) occur between the tool and the object to be formed as relative transverse movement is effected therebetween. The desired relative movement is accomplished by utilizing two follower bars pivotally connected at spaced apart axes to one of the members and operable to effect circular movement of the two pivot points at which they are connected to said one member in two arcs having the same center fixed relative to the other member. With two points of a rigid member moving in circular arcs having the same center, all points thereon, or fixed relative thereto, must move in circular arcs having the same center.

Figure 9:
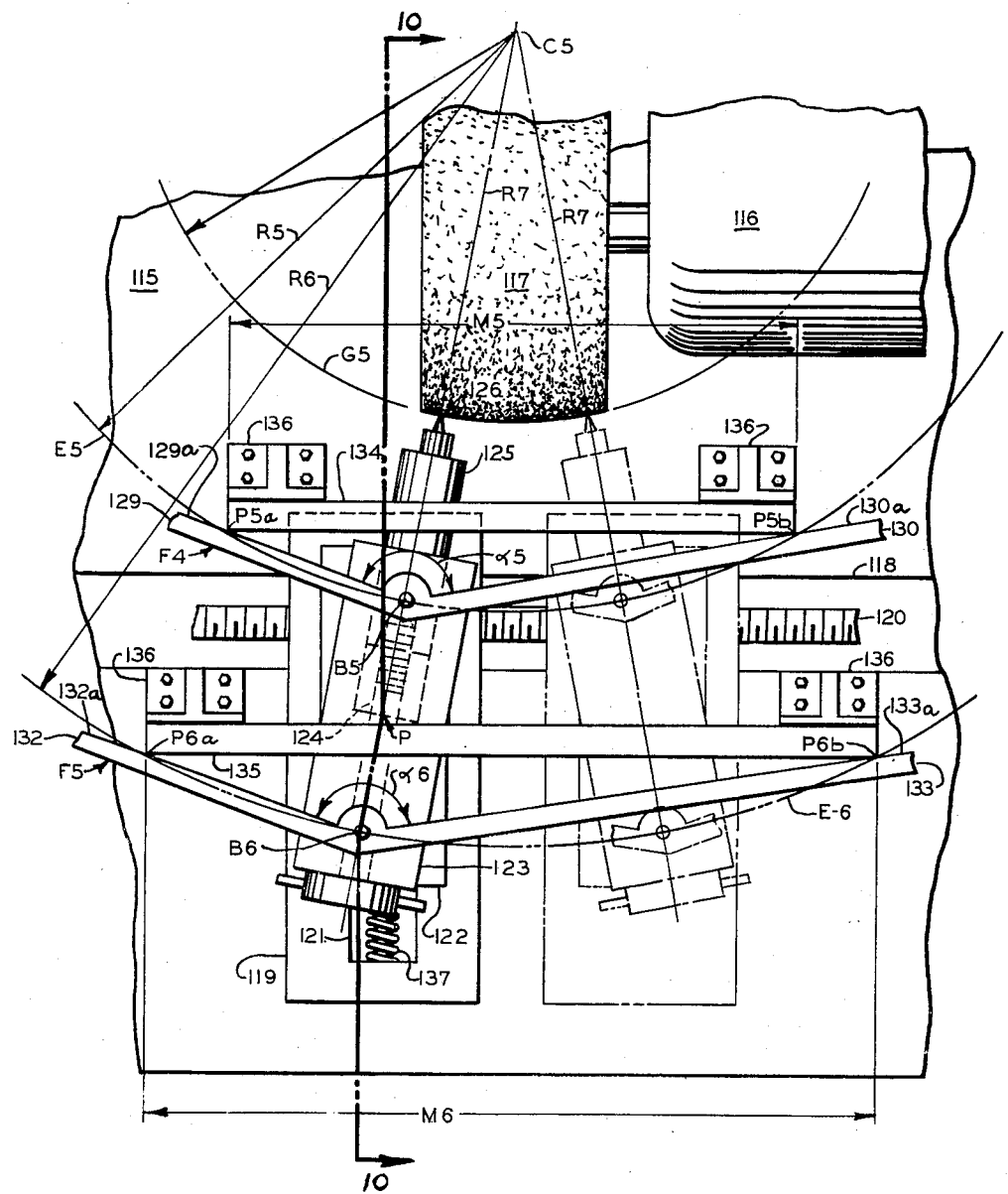
FIG. 9 is a plan view of the grinding wheel and truing mechanism of a grinding machine.

In FIGS. 9 and 10 there is shown the base 115 of a grinding machine having a wheelhead 116 held in a fixed position thereon for a truing operation on a grinding wheel 117 rotatably carried by the wheelhead. Base 115 has a recess 118 extending transversely to the grinding wheel, the recess 118 slidably receiving the dovetailed depending portion of a cross slide 119. A screw 120 is journaled in base 115 and threadedly engaged with the depending portion of the cross slide for transverse movement, in translation, of slide 119 on the base as the screw is rotated, as by a handwheel or motor (not shown). Cross slide 119 has an elongated recess 121, extending perpendicularly to the recess 118 in the base, which slidably receives the dovetailed portion of a slide 122 for movement, in translation, of slide 122 on slide 119, in a to and fro direction. Thus slide 122 is movable in translation relative to the grinding wheel which is rotated in a fixed position on the base during truing. Pivotally mounted on slide 122 is a tool carrying member 123 which can swivel on slide 122 about pivot axis P. Thus tool carrying member 123 is not only movable transversely and towards and away from the grinding wheel, but is also rotatable relative thereto. A screw 124, journaled in member 123, is threadedly engaged with diamond holder 125 which has diamond point 126 secured in its outer end.

Follower F4 having arms 129, 130 is pivotally connected at point B5 in its vertex, which point is at the intersection of the straight edges 129a, 130a, to the tool carrying member 123. Similarly, follower F5 having arms 132, 133 is pivotally connected at point B6 in its vertex, which point is at the intersection of the straight edges 132a, 133a, to the tool carrying member 123. Means is provided to define guide points P5a and P5b in the plane of the follower F4 (on opposite sides of the vertex of the follower) lying in arc E5, the guide points being fixed relative to the base and rotating grinding wheel so that center C5 of arc E5 is fixed relative to the base and the rotating grinding wheel. Means is also provided to define guide points P6a, P6b in the plane of follower F5 and in arc E6, which has the same center C5 as arc E5. In this embodiment the guide points are defined by the end corners of bars 134 and 135 which face the arms of the follower bars, each of said end corners constituting a guide and each of the bars 134, 135, which are secured to base 115 by brackets 136, defining a pair of transversely spaced guides. A compression spring 137 is received in recess 121 of cross slide 119 and is interposed between the end of recess 121 away from the grinding wheel and the depending dovetailed portion of member 122 to urge that member toward the grinding wheel.

With points P5a and P5b on a circular arc, the sine of angle ($\alpha 5$) between the arm guide lines defined by arm edges 129a and 130a must equal $$\frac{(M5)/2}{(R5)}$$

where (M5) equals the distance between guide points P5a, P5b and R5 equals the radius of circular arc E5, to position vertex point B5 on the circular arc E5. Similarly the sine of ($\alpha 6$) must equal $$\frac{(M6)/2}{R6}$$

where (M6) equals the distance betwen guide points P6a, P6b, and R6 equals the radius of circular arc E6. The vertexes of follower F5 and F6 are pivotally connected to tool carrying member 123 at axes spaced apart a distance (R6) minus (R5) so that points B5, B6 lie on a radial line R7 emanating from fixed center C5. The tool 126 is positioned on this radial line R7 and, since two points B5, B6 in the rigid member 123 move in circular paths about a single center point C5, all points on member 123 and the tool point 126 fixed relative thereto move in circular paths about the same center point. The tool point 126, aligned on radial line R7, follows path G5 as it moves about center C5 and is always oriented normal to the surface being contoured. As slide 122 is moved in translation across the grinding wheel, tool carrying member 123 pivots thereon, holding the tool 126 normal to the surface being contoured since the distance between the pivot points B5, B6 on member 123 is equal to the difference between radii R5 and R6.

In the embodiment of FIGS. 9 and 10 two spaced apart points B5, B6 on the member 123 (which in that embodiment was the tool carrying member) were moved in concentric circular arcs E5 and E6 of different radii to effect circular movement of the tool 126 in concentric circular arc G5 relative to the work. In the embodiment shown in FIGS. 11 and 12, two points on one member are moved in the same circular arc to effect movement of the point of the tool (which is fixed relative to those points) in a circular arc relative to the work. A base 140 has an upstanding portion 141 to which is secured, in conventional manner, a headstock 142 and a tailstock 143. A cylindrical roll 144 is received on an arbor 145 therebetween which is driven by headstock motor 146 through headstock transmission 147 to rotate the roll. The base has a table 148 mounted thereon for movement transversely, in direction X2, by handwheel 149. The table 148 has an elongated slot 150, extending in the Y2 direction perpendicularly to the direction of movement of table 148. The slot 150 receives pivot stud 151 of a swivel table 152 mounted on table 148. The pivot stud 151, which has a circular cross-section, has a diameter substantially equal to the width of the slot 150 so that it can move along the slot, and rotate in the slot, but can not move laterally in the slot. Thus the table 152 can move on table 148 in the direction Y2, and rotate on table 148, but has no transverse movement relative thereto. The table 152 has a toolholder 153 secured thereto in which a tool 154 is clamped so that the tool is held fixed relative to table 152.

Means is provided to define four guide points P7a, P7b, P8a, P8b in a plane parallel to the plane of the swivel table. The outer guide points P7a and P8b are fixed relative to the base 140 and rotating roll 144. The inner guide points P7b and P8a are adjustable relative to the base 140 and roll 144, to permit a change in the radius of the arc through which the tool is swung, but are held fixed relative to the base and roll during the forming operation. In an operation for forming a circular arc of a selected radius on the workpiece, the four guide points lie on the arc of a single circle. To form on the workpiece a circular contour, such as G7, having a center C7 which is fixed relative to the workpiece and the base, and which is equidistant from the outer guide points P7a, P8b, the inner guide points are adjusted to lie on a circle E7 passing through the outer guide points and having the same center C7 as the desired circular contour on the workpiece. The circle E7 will have a radius R8 equal to the radius of the desired arc G7 on the workpiece less the radial distance between the circle E7 and the point of the tool. It will be noted that a line between points P7a, P7b, and a line between points P8a, P8b each define chords of the circle E7 and the perpendicular bisectors of these chords intersect at center C7.

Two similar plates 155 are each pivotally connected to the base by a pin 156. Each plate can be clamped in a selected angular position to the base by a bolt 157 threadedly received in the base and extending through a slot 155a in the plate. Two guide bars 158, 159, secured, respectively, to the two plates 155 by brackets 160, have ends which constitute guides, each bar defining a pair of transversely spaced guides, and the two end corners on the side of each guide bar opposite the bracket 160 defining the guide points. The outer corners of the two guide bars opposite the bracket 160 define, respectively, the fixed guide points P7a, P8b and these corners lie above pivot pins 156 so that the guide points P7a, P8b lie in the axes of rotation of plates 155 about pins 156. Thus the guide points P7a, P8b remain fixed in any angular adjustment of plates 155. The inner corners of the two guide bars opposite the bracket 160 are spaced from the pivot axes of the plate and define the two adjustable guide points P7b, P8a.

The swivel table 152 has two transversely spaced projections 161, 162 with a V-shaped follower bar F7 pivotally connected at its vertex B7 to projection 161 and a similar V-shaped follower bar F8 similarly connected at its vertex B8 to projection 162. A spring 165 in slot 150 urges pivot pin 151, and table 152, away from the work and thereby holds the follower bars against the guide points. The pivot axes B7 and B8 lie at the intersection of guide line L7a, L7b and L8a, L8b defined by the straight edges of the arms which engage the guide points.

The guide points P7a, P7b are spaced apart a distance M7 established by the length of the guide bar 158. The arms of follower bar F7, which are angularly adjustable, are angularly spaced apart an angle $\alpha 7$ of a magnitude to place the pivot axis B7 on the circle E7 when the follower F7 is engaged with guide points P7a, P7b. The guide points P8a, P8b are spaced apart a distance M8 established by the length of the guide bar 159. The arms of follower bar F8, which are also angularly adjustable, are angularly spaced apart an angle $\alpha 8$ of a magnitude to place the pivot axis B8 on the circle E7 when the follower F8 is engaged with guide points P8a, P8b. With this construction, the points of the table 152 at which vertexes B7, B8 are pivotally connected will move in the circular arc E7 about center C7 when transverse motion is imparted to table 148. Thus any point on table 152, or any point fixed relative thereto, such as the point of tool 154, will move in a circular arc about center C7. For convenience M7 can be made equal to M8 and $\alpha 7$ can be made equal to $\alpha 8$, but, to effect movement of the ends of the swivel table 152 at axes B7, B8 in circular arcs having the same radius, it is only necessary that $$R8 = \frac{M7}{2 \sin \alpha 7} = \frac{M8}{2 \sin \alpha 8}$$

In the embodiment shown in FIGS. 11 and 12 the workpiece 144 is rotated on an axis A2 which extends in a tangential direction relative to the arcs E7 and G7. More specifically, the workpiece is aligned parallel to direction X–2 and parallel to a line between the fixed guide points P7a and P8b. The tool 154 is aligned on a radial line from center C7 and the circular contour G7 formed on the workpiece is a concave arc having its center at C7. Since the circular arc G7 formed on the workpiece has the center C7, and the tool is aligned on a radial line from center C7, the tool will always be normal to the contour being formed on the workpiece.

If it is desired to form a circular contour on the workpiece 144 having a different radius, the angles between the arms of the follower bars and the two inner guide points must be changed (assuming the outer guide points are fixed and the distances M7, M8 between the guide points of each pair remain the same). If the new contour has a center at C7′ equidistant from the fixed guide points P7a, P8b, the plates 155 are angularly adjusted to place the inner guide points at P7b′ and P8a′, which points lie on a circle E7′ passing through the fixed outer guide points P7a, P8b and having a center at C7′. In other words, the the guide bars 158 and 159 are adjusted so that the perpendicular bisectors of the line between the corner bar edges defining guide points P7a and P7b′ and the line between the corner bar edges defining guide points P8a′ and P8b intersect at C7′. The new angles between the arms of the respective followers $\alpha 7'$ and $\alpha 8'$ (not shown) will be of a magnitude to place the pivot axes B7 and B8 on the circle E7′ and will satisfy the equation $$R8' = \frac{M7}{2 \sin \alpha 7'} = \frac{M8}{2 \sin \alpha 8'}$$

where R8′ equals the radius of the circle E7′.

In the embodiment of FIGS. 9, 10, and in the embodiment of FIGS. 11, 12, the member carrying the object to be formed and the guide points were held fixed while the member carrying the tool was moved to effect the circular contouring. It is not, however, the absolute motion of the member carrying the object to be formed, or the absolute motion of the tool carrying member, which is important, but, instead, it is only the relative motion between these members which is important in the formation of a circular contour on the object to be formed. The use of two V-shaped follower bars cooperating with guide points can produce relative circular movement between two members even though neither member moves in a circular path. For example, in the embodiment of FIGS. 11 and 12, if the construction were modified so the workpiece 144 and guide points were moved together transversely, and the table 148 were held stationary, the same contour would be produced on the workpiece.

In the previously described embodiments of the invention in which two points on a member were moved by the coaction of two followers with guide points, two pairs of guide points were utilized, each pair coacting with one of the followers. In the embodiment of the invention shown in FIGS. 13, 14, 15, 16 two followers are provided but only a single pair of guide points is used, this pair coacting simultaneously with both followers. A base 170 of a roll grinding machine has an upstanding portion 171 having a wheelhead 172 mounted thereon which rotatably supports a grinding wheel 173. The wheelhead is mounted for adjusting movement, during set up, in direction Y4, by handwheel 174 which is operatively connected to the wheelhead through a shaft 175 journaled in the base and a pinion 176 on shaft 175 engaged with rack 177 on the wheelhead. The wheelhead remains fixed on base portion 171 during grinding to hold a grinding wheel 173 in a fixed position, the grinding wheel comprising the forming tool in this embodiment.

The base 170 has a slide or table 178 mounted thereon for movement in a direction X4 by rotation of handwheel 179 which is operatively connected to screw 180 journaled in the base and threadedly engaged with a depending portion of table 178. The table 178 has a headstock 181 mounted in a fixed position thereon, and has a swivel table 182 mounted for linear movement towards and away from the grinding wheel, and turning movement, thereon. The connection of the swivel table 182 to table 178 includes a block 183 pivotally connected to and depending from swivel table 182, the block 183 being slidably received in an elongated recess 184 in table 178 extending in direction Y4. With this construction swivel table 182 pivots on table 178 about axis 185 through the block, and the block moves linearly in slot 184, in the Y4 direction, to move the swivel table towards and away from the grinding wheel 173.

The swivel table has a bracket 190 secured thereto having spaced upstanding arms 191, 192 in which shaft 193 is journaled. Shaft 193 is connected to headstock shaft 194 through a two part universal connection having one part 195 pivotally connected to shaft 194 and having a second part 196 splined in part 195 and pivotally connected to shaft 193. The roll 197 to be crowned is secured on shaft 193 for rotation between arms 191, 192.

A bracket 200 having vertically spaced extending arms 201, 202 is connected to one end of swivel table 182. A vertical pivot pin 203 extending between the arms is rotatably carried by the bracket. Pivot pin 203 is tightly received in one arm 204 of a follower F9, the arm 204 having a finger 205 extending therefrom. A second arm 206 of follower F9, below arm 204 thereof, is rotatably mounted on pin 203 and has a finger 207, spaced from finger 205, extending therefrom. A bolt 208 has left and right hand threads threadedly engaged in blocks 209 secured, respectively, in fingers 205 and 207 for setting the angle between the follower arms. The follower arms 204 and 206 have straight edges 204a and 206a, respectively, defining guide lines which intersect at the axis of rotation B9 of pivot pin 203. A bracket 210, similar to bracket 200, is connected to the other end of the swivel table 182 and pivotally supports a V-shaped follower F10, similar in construction to follower F9. The straight edges 211a and 212a of lower arm 211 and upper arm 212 of follower F10 intersect at the pivot connection B10 of the follower to the swivel table. As shown best in FIG. 16, the followers are displaced vertically a small amount to avoid interference, the upper arm 204 of follower F9 lying in the same plane as the lower arm 211 of follower F10.

A guide 224 has a bracket 225 mounted on base 170 with vertically spaced horizontal arms 225a and 225b extending over the base. Roller bearings 226 in each arm each rotatably support a pivot shoe 227 having a flat guide face 228, both guide faces 228 passing through the axis P9a of rotation of the shoes. Arm 212 of follower F10 and arm 204 of follower F9 extend between guide arms 225a, 225b for engagement of edges 212a and 204a, respectively, with the flat guide faces 228 of the two shoes. Thus the pivot axis P9a defines a guide point through which the straight guide lines defined by edges 212a and 204a pass. A similar guide 229, transversely spaced from guide 224, is also mounted on base 170 to define a guide point at P9b for the straight edge 211a of follower F10 and straight edge 206a of follower F9.

Hydraulic cylinders are provided to hold the follower arms in contact with the guide points. A cylinder 230 in table 178 has a piston 231 with piston rod 232 connected to the block 183. Two cylinders 233 and 234 are formed in bracket 225 of guide 224 and each has a piston 235 connected to rod 236 which has a roller 237 mounted thereon adapted to engage a follower arm. Similar cylinders are mounted in guide 229. A hydraulic pump 238 supplies fluid under pressure to a line 239, the pressure in line 239 maintained at a relatively low value by relief valve 240. Line 239 is connected to one end of cylinders 230, 233, and 234, respectively, while the other ends of these cylinders are connected to sump 247 by line 248. Thus swivel table 182, and each of the four follower arms, are urged toward the grinding wheel to hold the follower arms in engagement with the shoes 227 defining guide points.

The guides 224 and 229 are located in straddling relation to swivel table 182, and hence in straddling relation to the respective pivot axes B9, B10 at which the two followers are connected to the swivel table. Therefore the guides 224 and 229 serve as guide points for both V-shaped followers. The angle α9, between edges 204a and 206a of follower F9, equals the angle α10 between edges 211a and 212a of follower F10, and the guide points P9a, P9b, and the pivot axes B9, B10 at which the V-shaped followers are connected to the swivel table, must be in the arc E9 of a circle. This is because three points define a particular circle, and if a circular arc, such as E9, is drawn through P9a, B9, and P9b, the angle α9 will be an inscribed angle whose sides 204a, 206a are chords intercepting the circular arc at P9a and P9b. Two angles having their vertexes on a circle and intercepting the same arc of the circle are equal. Since angle α10 is equal to angle α9, and its sides 211a and 212a intercept the circular arc E9 at the same points as angle α9, the vertex of angle α10 must lie on the same circular arc as the vertex of α9.

As the table 178 is moved transversely by rotation of screw 180, either by handwheel 179 or by power means (not shown), the points B9, B10 at which the swivel table is connected to the two follower bars F9 and F10 must move in the circular arc E9 because the angles α9, α10 remain fixed during the operation and the follower bars are held engaged with the guide shoes. With two points of the swivel table moving in a circular path about a center, all points on or fixed relative to the swivel table are moved about that same center. The plane H9 of the grinding wheel 173 passes through the center (not shown) of arc E9 so the grinding wheel is normal to the arc E9. The roll 197 is mounted on swivel table 182 aligned in a tangential direction to arc E9 (that is, parallel to a line between points B9, B10) so the roll remains normal to the grinding wheel as it swings past the grinding wheel during forming.

What is claimed is:

1. In a machine tool a first member to support an object to be formed, a second member to support a forming tool, said members mounted for relative movement in a plane between the object to be formed and the forming tool including relative transverse movement, relative to and fro movement, and relative swiveling movement, means defining at least one pair of transversely spaced guides fixed relative to one of said members, said guides defining transversely spaced guide points, and at least two V-shaped followers having arms intersecting at a vertex, said vertex pivotally connected at spaced apart pivot axes to the other of said members, each of the follower arms engaged with a guide to determine the relative to and fro movement and the relative swiveling movement between said members as relative transverse movement is effected therebetween.

2. In a machine tool, a first member to support an object to be formed, a second member to support a forming tool, said members mounted to permit relative movement in a plane between the object to be formed and the forming tool, said movement including relative transverse movement, relative to and fro movement, and relative swiveling movement, at least one pair of transversely spaced guides fixed relative to one of said members to define guide points, at least two followers pivotally connected to the other of said members for pivoting parallel to said plane of relative movement about spaced apart axes, each follower having a pair of arms extending from its pivot axis with a predetermined angle therebetween, the arms of each follower engaged with guides to define straight lines passing through the guide points and intersecting at the pivot axis of the follower.

3. In a machine tool, a first member to support an object to be formed, a second member to support a forming tool, said members mounted to permit relative movement in a plane between the object to be formed and the forming tool, said movement including relative transverse movement, relative to and fro movement, and relative swiveling movement, at least one pair of transversely spaced guides fixed relative to one of said members to define transversely spaced guide points, at least two followers connected to the other of said members at spaced pivot axes for pivoting movement parallel to said plane, each follower having a pair of arms extending from its pivot axis with a predetermined angle therebetween, each arm of each follower engaged with a guide to define a straight guide line passing through the guide point, the guide lines of the two arms of each follower intersecting at the pivot axis of the follower whereby the pivot axis of each follower and the guide points defined by the guides engaged with said follower define a circle at any position of the pivot axis between the guide points, said circle having a center determined by the position of the guide points and the angle between the lines defined by the follower arms, the two circles containing, respectively, the two pivot axes having the same center.

4. In a machine tool, a first member to support an object to be formed, a second member to support a forming tool, said members mounted to permit relative movement in a plane between the object to be formed and the forming tool, said movement including relative transverse movement, relative to and fro movement, and relative swiveling movement, at least one pair of transversely spaced guides fixed relative to one of said members to define transversely spaced guide points, at least two V-shaped followers connected to the other of said members for pivoting movement parallel to said plane about spaced apart axes, each follower having a pair of arms extending from its pivot axis, the arms of each follower engaged with guides to define two straight lines passing respectively through the guide points defined by the guides engaged by the follower, said lines intersecting at the pivot axis of the follower, the pivot axes of both followers and the guide points lying on the same circle.

5. In a machine tool having a base, a slide mounted on the base for movement along a straight path thereon, said slide restrained from rotation relative to the base, a table pivotally mounted on the slide and movable along a straight path thereon at an angle to the path of the slide, at least one pair of guides mounted on the base and spaced apart in the direction of the path of the slide to define guide points fixed relative to the base, two V-shaped followers pivotally connected, respectively, to said table at axes spaced apart in the direction of the path of the slide, each follower having two angularly spaced arms engaged, respectively, with two spaced guides, the pivot axes of the followers and the guide points lying in a common circle, the machine tool having a forming tool and means to support an object to be formed, one of which is mounted on the base and the other of which is mounted on the table, and means to move said slide along its path to produce a circular contour on the object to be formed.

6. In a machine tool, a base, a forming tool mounted on the base, a slide mounted on the base for transverse translational movement thereon along a straight path past the forming tool, a table pivotally mounted on the slide and movable along a straight path thereon towards and away from the forming tool, means to mount a workpiece for rotation on the table, at least one pair of transversely spaced guides mounted on the base to define two transversely spaced guide points in a plane parallel to the table, two followers pivotally connected to the table at transversely spaced pivot axes for pivotal movement in said plane parallel to the table, each follower having a pair of angularly spaced arms extending from the pivot axis for engagement, respectively, with the transversely spaced guides, each arm of each follower defining a straight guide line passing through the pivot axis and the guide point defined by the guide engaged with the arm, said pivot axes and the guide points lying on a common circle, means to bias the table to hold the arms of the followers in engagement with the guides, and means to effect transverse movement of said slide.

7. In a machine tool, a first member to support an object to be formed, a second member to support a forming tool, said members mounted for relative movement in a plane between the object to be formed and the forming tool including relative transverse movement, relative to and fro movement, and relative swiveling movement, means defining two transversely spaced guides fixed relative to one of said members, said guides defining transversely spaced guide points, two V-shaped followers each having two arms intersecting at a vertex, said vertexes pivotally connected at spaced apart pivot axes to the other of said members, the arms of both followers angularly spaced apart a like amount and the two arms of each follower engaged respectively with said two guides to determine the relative to and fro movement and the relative swiveling movement between said members as relative transverse movement is effected therebetween, said two vertexes and said two guide points lying on a common circle having a center fixed relative to said one of said members and the guides.

8. In a grinding machine, a base, a grinding wheel mounted on the base for rotation in a fixed position thereon during grinding, a slide mounted on the base for transverse translational movement thereon along a straight path past the grinding wheel, a table pivotally mounted on the slide for pivotal movement in a plane relative to the slide, said table movable along a straight path on the slide and in said plane towards and away from the grinding wheel, means to mount a workpiece for rotation on the table, two transversely spaced guides mounted on the base to define two transversely spaced guide points in a plane parallel to the plane of movement of the table, two followers pivotally connected to the table at transversely spaced pivot axes between the guides for pivotal movement in said plane parallel to the plane of movement of the table, each follower having two angularly spaced arms extending from the pivot axis, the arms of the two followers angularly spaced a like amount and the two pivot axes of the followers lying on a circle passing through the guide points, each arm of each follower defining a straight guide line passing through the pivot axis of the follower and the guide point defined by the guide engaged with the arm, said straight guide line constituting a chord of said circle, means to bias the table to hold the arms of the followers in engagement with the guides, and means to effect transverse movement of the table.

9. The combination of claim 3 in which the forming tool is aligned with a common radial line of said circles.

10. The combination of claim 4 in which the forming tool is aligned with a radial line of said circle and the object to be formed is a roll aligned in a tangential direction to said circle.

11. The combination of claim 7 in which the forming tool is aligned with a radial line of said circle.

12. The combination of claim 8 in which the plane of the grinding wheel passes through the center of said circle and the workpiece mounting means supports the workpiece for rotation about an axis extending in a direction tangential to said circle.

References Cited in the file of this patent
UNITED STATES PATENTS

| | | |
|---|---|---|
| 1,448,848 | Lafler | Mar. 20, 1923 |
| 1,668,746 | Turner | May 8, 1928 |